(12) United States Patent
Mahoney et al.

(10) Patent No.: US 6,609,843 B2
(45) Date of Patent: Aug. 26, 2003

(54) RESOURCE ACQUISITION WITH A PRINTING DEVICE

(75) Inventors: Terry P. Mahoney, Boise, ID (US); James E. Anderson, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 81 days.

(21) Appl. No.: 09/874,192

(22) Filed: Jun. 4, 2001

(65) Prior Publication Data

US 2002/0178941 A1 Dec. 5, 2002

(51) Int. Cl.[7] ................................................. G06F 3/12
(52) U.S. Cl. ........................................................ 400/70
(58) Field of Search ............................. 400/70, 71, 73; 359/159; 705/26; 455/557; 358/1.18

(56) References Cited

U.S. PATENT DOCUMENTS

| 5,950,173 A | * | 9/1999 | Perkowski ................... 705/26 |
| 6,236,486 B1 | * | 5/2001 | Nocker, IV ................. 359/159 |
| 6,285,889 B1 | * | 9/2001 | Nykanen et al. ............ 455/557 |
| 6,411,397 B1 | * | 6/2002 | Petteruti et al. ........... 358/1.18 |

FOREIGN PATENT DOCUMENTS

JP          0347361     * 12/1998    ............. G06F/3/12

* cited by examiner

*Primary Examiner*—Anh T. N. Vo

(57) ABSTRACT

A printing device receives information that identifies a resource locator, determines from the resource locator the resource and a location of the resource in a resource system, accesses the resource, and prints the resource. The printing device receives the information from a wireless or direct-connect input device, or the printing device receives an image of the information from a scanning device.

27 Claims, 4 Drawing Sheets

US 6,609,843 B2

RESOURCE ACQUISITION WITH A PRINTING DEVICE

TECHNICAL FIELD

This invention relates to methods and systems for accessing resources in a network environment and, in particular, to methods and systems for accessing resources corresponding to a resource locator.

BACKGROUND

Product manufacturers and distributors want to distribute product information to as many consumers as possible in a cost effective manner. Many manufacturers and distributors choose to reach consumers with product information over the Internet. Likewise, many consumers search for product information and research product features via the Internet. Typically, a personal computer facilitates access to the Internet and a desktop monitor or display allows a consumer to view a product manufacturer or distributor's Web page.

Not all consumers, however, have access to a personal computer with a display to view product information available via the Internet. Some consumers are not aware, or do not know where to obtain such information and resources, and some consumers may only have a cell phone, personal digital assistant, or similar portable electronic device that cannot adequately display a Web page or similar information.

A device or system that both enables product manufacturers and distributors to disseminate product information to consumers, and enables consumers to receive particular product information without necessarily requiring a personal computer, would facilitate the needs of both parties in a manner that provides consumer directed product information.

SUMMARY

A printing device is configured to receive information that identifies a resource locator, such as a universal product code (UPC) or a uniform resource locator (URL). The printing device can receive the information, or resource locator, from a wireless source or from a direct-connect input device. Alternatively, the printing device can determine a resource locator from a scanned image. The printing device can have an integrated scanning device to generate the scanned image.

The printing device determines, from the resource locator, an associated resource and a location of the resource in a resource system. The printing device can then access and download the resource, and print the resource. The resource can also be rendered with a display device connected to the printing device, or interconnected with the printing device via a network system. Alternatively, the resource can be routed via a network system to update a peripheral device, or a component of a peripheral device.

BRIEF DESCRIPTION OF THE DRAWINGS

The same numbers are used throughout the drawings to reference like features and components.

DETAILED DESCRIPTION

Introduction

Systems and methods for acquiring resources and distributing information in a network environment are described. A network environment implemented, for example, as a resource acquisition station can help consumers access such resources as product information. A resource station can be implemented with a printer and does not require a computer display device to render resources for a consumer. Products can be any goods, and in some instances services, that a consumer may desire more information about, such as medications, food, power tools, pesticides, stereo equipment, music, and the many other possibilities. A resource system also facilitates the distribution of information to targeted consumers from product manufacturers about particular products. Product manufacturers can inform such consumers about product updates, accessories, recalls, and the like via a resource information system.

Exemplary Printer Architecture

Figure 1:
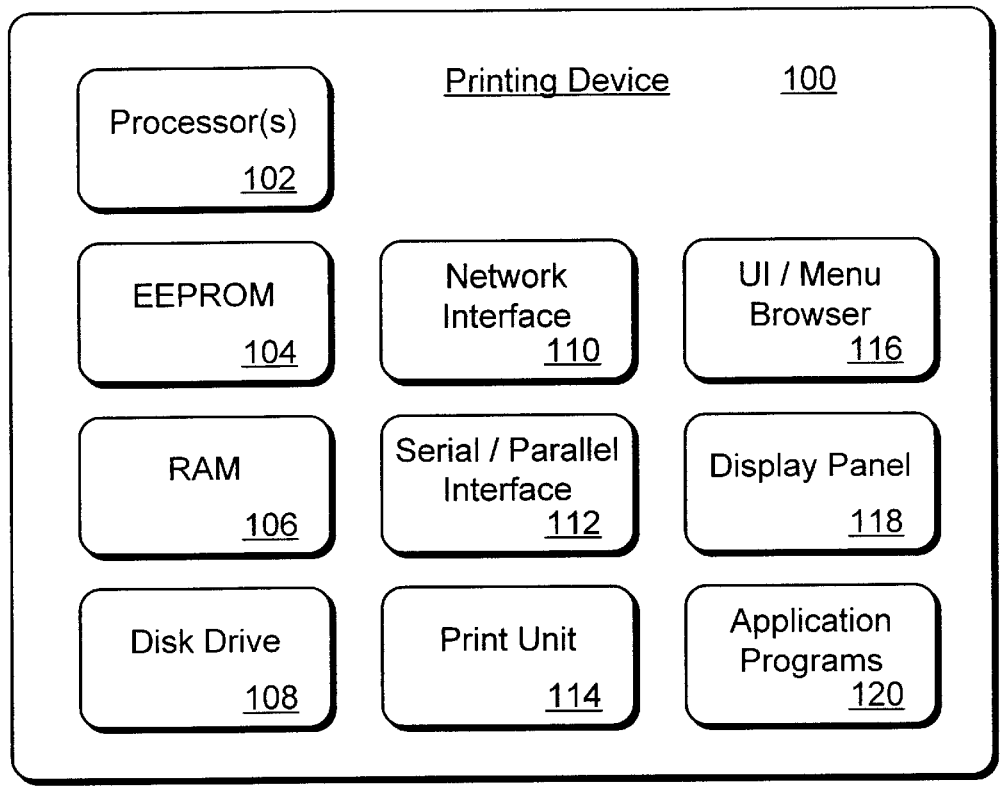
FIG. 1 is block diagram that illustrates various components of an exemplary printing device.

FIG. 1 illustrates various components of an exemplary printing device 100 that can be utilized to implement the inventive techniques described herein. Printer 100 includes one or more processors 102, an electrically erasable programmable read-only memory (EEPROM) 104, and a random access memory (RAM) 106. Although not shown, a system bus typically connects the various components within the printing device 100.

Processor(s) 102 process various instructions to control the operation of the printer 100 and communicate with other electronic and computing devices. The memory components, EEPROM 104 and RAM 106, store various information and/or data such as configuration information, fonts, templates, data being printed, and menu structure information. Although not shown, a particular printer can also include a ROM (non-erasable) and/or a flash memory device in place of or in addition to EEPROM 104.

Printer 100 also includes a disk drive 108, a network interface 110, and a serial/parallel interface 112. Disk drive 108 provides additional storage for data being printed or other information maintained by the printer 100. Although printer 100 is illustrated having both RAM 106 and a disk drive 108, a particular printer may include either RAM 106 or disk drive 108, depending on the storage needs of the printer. For example, an inexpensive printer may include a small amount of RAM 106 and no disk drive 108, thereby reducing the manufacturing cost of the printer.

Network interface 110 provides a connection between printer 100 and a data communication network. The network interface 110 allows devices coupled to a common data communication network to send print jobs, menu data, and other information to printer 100 via the network. Similarly, serial/parallel interface 112 provides a data communication path directly between printer 100 and another electronic or computing device. Although printer 100 is illustrated having a network interface 110 and serial/parallel interface 112, a particular printer may only include one interface component.

Printer 100 also includes a print unit 114 that includes mechanisms arranged to selectively apply ink (e.g., liquid ink, toner, etc.) to a print media such as paper, plastic, fabric, and the like in accordance with print data corresponding to a print job. For example, print unit 114 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 114 can also be configured to support duplex printing, for example, by selectively flipping or turning the print media as required to print on both sides. Those skilled in the art will recognize that there are many different types of print units available, and that for the purposes of the present invention, print unit 114 can include any of these different types.

Printer 100 also includes a user interface and menu browser 116 and a display panel 118. The user interface and menu browser 116 allows a user of the printer 100 to navigate the printer's menu structure. User interface 116 can be indicators or a series of buttons, switches, or other selectable controls that are manipulated by the user of the printer. Display panel 118 is a graphical display that provides information regarding the status of the printer 100 and the current options available to the user through the menu structure.

Printer 100 can, and typically does include application programs 120 that provide a runtime environment in which software applications or applets can run or execute. One exemplary runtime environment is a Java Virtual Machine (JVM). Those skilled in the art will recognize that there are many different types of runtime environments available. A runtime environment facilitates the extensibility of printer 100 by allowing various interfaces to be defined that, in turn, allow the application programs 120 to interact with the printer.

Exemplary Computer Architecture

Figure 2:
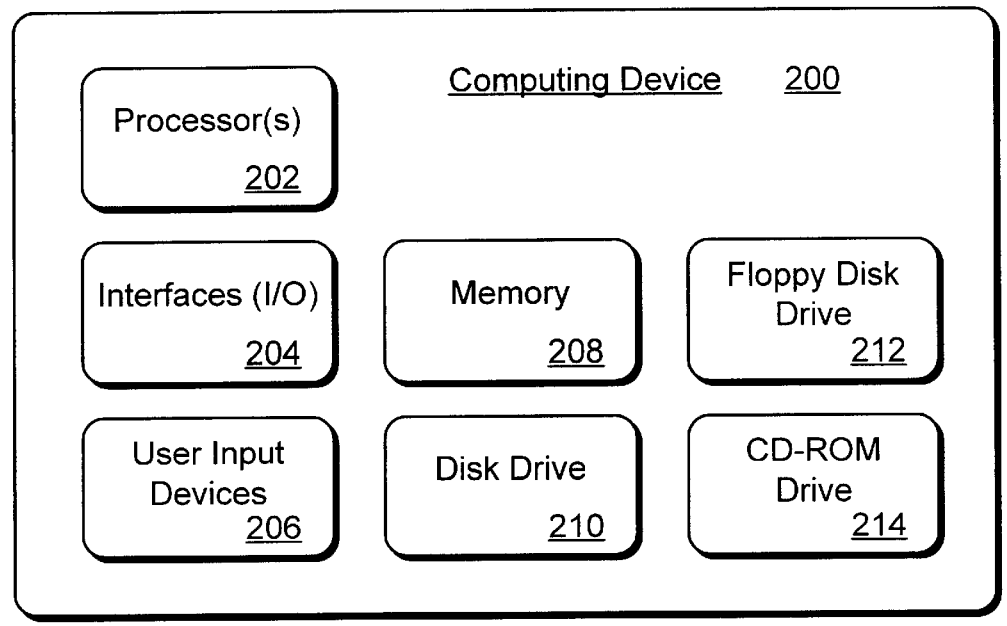
FIG. 2 is block diagram that illustrates various components of an exemplary computing device.

FIG. 2 illustrates various components of an exemplary computing device 200 that can be utilized to implement the inventive techniques described herein. Computer 200 includes one or more processors 202, interfaces 204 for inputting and outputting data, and user input devices 206. Processor(s) 202 process various instructions to control the operation of computer 200. Interfaces 204 provide a mechanism for computer 200 to communicate with other electronic and computing devices. User input devices 206 include a keyboard, mouse, pointing device, or other mechanisms for interacting with and inputting information to computer 200.

Computer 200 also includes a memory 208 (such as ROM and/or RAM), a disk drive 210, a floppy disk drive 212, and a CD-ROM drive 214. Memory 208, disk drive 210, floppy disk drive 212, and CD-ROM drive 214 provide data storage mechanisms for computer 200. Although not shown, a system bus typically connects the various components within the computing device 200.

Exemplary Resource Acquisition System

Figure 3:
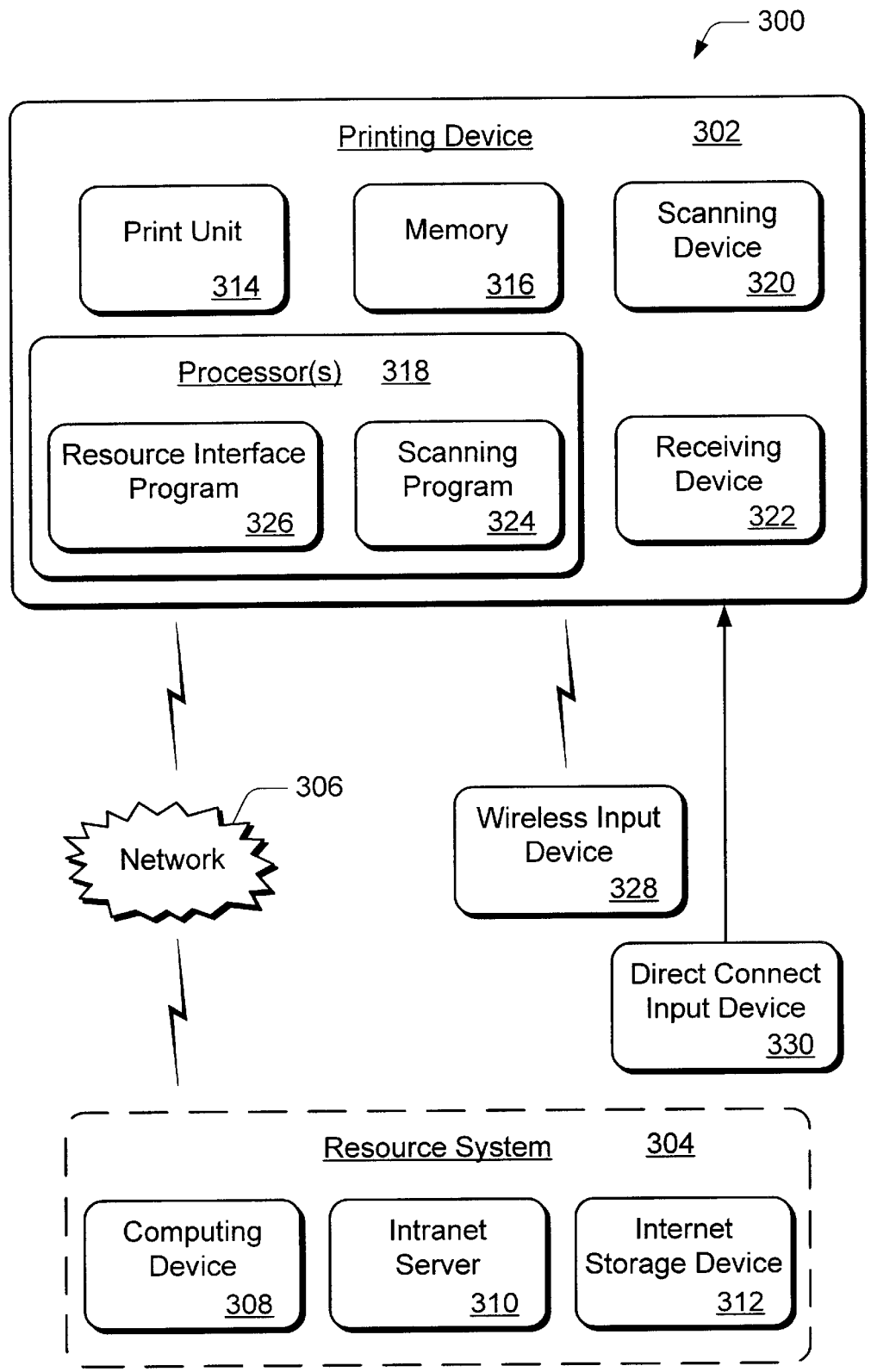
FIG. 3 is a block diagram that illustrates components of various configurations of a resource acquisition and information system in an exemplary network environment.

FIG. 3 illustrates components of a network environment 300 in which a printing device 302 is connected with a resource system 304 via a network system 306. The printing device 302 can include one or more of the components of the exemplary printing device 100 (FIG. 1). The resource system 304 can include any network storage device, computing device, appliance server, and the like that stores and maintains resources such as information and data. As shown, the resource system 304 can include a computing device 308, an intranet server 310, and/or an Internet storage device 312. The computing device 308, intranet server 310, and any such data storage device 312 connected to the Internet can include, or be implemented with, one or more of the components of the exemplary computing device 200 (FIG. 2).

The network system 306 can be any type of network, such as a local area network (LAN) or a wide area network (WAN), using any type of network topology and any network communication protocol. Although only a few devices are shown interconnected via network 306, a typical network can have any number of devices connected to it, either directly or indirectly via another network system. The Internet is an example of multiple connected network systems each having multiple devices. The printing device 302 and the various components of the resource system 304 can also have modems and/or network cards that facilitate network communication and data transfer via the network system 306.

The printing device 302 includes a print unit 314, a memory 316, and one or more processors 318. Each of these components are described above with respect to the exemplary printing device 100 (FIG. 1). The printing device 302 can also include a scanning device 320 and/or a receiving device 322. A device such as printing device 302 that can both print and scan media is commonly known as a multi-function device.

The scanning device 320 scans images from magazines, newspapers, photographic prints, and any other image sources. A scanning device has a transducer component to convert an image to an electronic description of the image. For example, scanning device 320 can be implemented as a contact image scanner (CIS), or as a digital camera. A scanning program 324, such as optical recognition software, executes on a processor 318 to process an image scanned with the scanning device 320. Optical character recognition software identifies a scanned image, or a portion thereof, and translates the image into character codes, such as ASCII text for example.

In one embodiment, printing device 302 comprises a resource acquisition station (or kiosk, product information station, resource system, or similar moniker) that facilitates a consumer's request for information regarding a product or service. A resource station can be implemented at or near any product outlet, such as in a retail store. In one instance, a consumer can scan a universal product code (UPC) on a product with scanning device 320 to receive information corresponding to the product. For example, a consumer can receive precautionary information regarding a medication from a resource station in a pharmacy, or receive an instruction and safety manual for a newly purchased power tool from a resource station in a hardware store.

Bar code symbology is an implementation of a UPC and can be designed to indicate a resource corresponding to a particular product and a location of the resource in the resource system 304. Typically, a UPC is an encoded product identification number that uniquely identifies a particular product. Those skilled in the art will recognize that there are many different types of product codes and variations of the product codes that can be utilized as resource locators. Common product codes include a UPC, versions A through E, an EAN (foreign code format) versions EAN-13 and EAN-8, a JAN (Japanese article numbering format), and an IAN (international article numbering system).

When a consumer requests information regarding a product by scanning a UPC associated with the product, the scanning program 324 processes the scanned image to determine the corresponding information, or resource, and the location of the resource in the resource system 304. If a resource acquisition station is located in a music store, for example, the resource station can be implemented with only the printing device 302. Information corresponding to the inventory of the music store can be stored in memory 316. A resource interface program 326 executes on a processor 318 to resolve a resource request and the resource location in memory 316. If the information, or a resource, for a particular music media is available in memory 316, the print unit 314 renders the informaiton for the consumer.

Alternatively, the music store resource station can be implemented with the printing device 302, network 306, and a local server device (e.g., computing device 308 or intranet server 310) within the music store. Information corresponding to the inventory of the music store can be maintained by the computing device 308 or intranet server 310 for local access by the printing device resource interface program 326. The music store resource station can also be implemented to access the Internet and an Internet storage device 312 via the network system 306. Information corresponding to the inventory of the music store can be stored on a storage device 312 for remote access by the printing device resource interface program 326.

The music store resource station can also be implemented as a combination of the resource stations described above. For example, the resource station can be implemented locally with the printing device 302 only, or with the printing device 302 and a local server device within the music store. Additionally, a product consumer can have the option to receive information corresponding to the inventory of the music store by requesting that the resource station access an Internet storage device 312 via the network system 306.

Each implementation of the music store resource station is implemented not only for consumer resource acquisition, but also to facilitate the distribution of information from product manufacturers. Such information can include product updates, accessory information, recall notices, and the like. For example, a consumer may purchase a stereo component and request information about the component, via a resource station, by scanning the UPC associated with the product. Along with information pertaining to the setup and control of the stereo component, the product manufacturer can also designate that the requesting consumer receive information pertaining to other components and accessories that complement the purchased stereo component. The particular stereo component information and the accessory information can be rendered with the printing device print unit 314 for the requesting consumer.

The printing device 302 can be implemented as a resource acquisition station having an integrated scanning device. The scanning device 320 can be utilized to scan a magazine page, or other image source, containing a UPC associated with a product. The image source can also contain a uniform resource locator (URL) corresponding to the address of a file or resource accessible on the Internet having information associated with a product. The scanning program 324 can determine a UPC or URL from the scanned image. Those skilled in the art will recognize that optical recognition software can determine a UPC or URL from a scanned image from identifiers such as underlining a URL, or determining an identifying icon that indicates the presence of a UPC or URL.

The type of resource accessible on the Internet depends on the Internet application protocol. Using the hypertext transfer protocol (HTTP) of the World Wide Web (Web), the resource can be an HTML (hypertext markup language) page, an image file, a program such as a common gateway interface application, a Java applet, or any other file supported by HTTP. A URL contains the name of the protocol required to access a resource, a domain name that identifies a specific computer or storage device on the Internet, and a hierarchical description of a file location on the computer or storage device.

When an image source containing a resource locator, such as a UPC or URL, is scanned with scanning device 320, the scanning program 324 determines, or identifies, the resource locator from the scanned image and the resource interface program 326 resolves the identity of the resource and the resource location. If the resource locator is a URL specifying a page on the Internet, the resource interface program 326 facilitates accessing and retrieving the resource from the resource system 304 (e.g., from an Internet storage device 312) and the print unit 314 renders the resource. Those skilled in the art will recognize that a URL and a uniform resource name (URN) are both types of uniform resource identifiers (URIs), and that any form of a URI can be a resource locator to identify content or a resource such as a page of text, a video or sound clip, a still or animated image, an application program, and the like.

The network environment 300 shown in FIG. 3 also illustrates that the printing device 302 can receive input at the receiving device 322 from a wireless input device 328 or a direct connect input device 330. Those skilled in the art will recognize that the receiving device 322 can be configured to receive any form of electrical signals from an input device such as an infrared or ultraviolet transmission, or via radio wave technology such as Bluetooth, for example. A wireless input device 328 can be a cellular phone, personal digital assistant (PDA), or other electronic, portable electronic, or computing device. A direct connect input device 330 can be any user input device or mechanism that interconnects with printing device 302 to facilitate user interaction.

Bluetooth is a computing and telecommunications industry specification that describes how mobile phones, computers, and personal digital assistants can be interconnected with each other and with home and business phones and computers using a short-range wireless connection. Bluetooth facilitates the coordination of mobile and fixed computer devices and can be utilized to synchronize information in a desktop or notebook computer, initiate the sending or receiving of a fax, or, in an embodiment of the technology described herein, initiate a print-out of a resource.

The printing device 302 can be implemented as a resource acquisition station having an integrated receiving device. The receiving device 322 can receive electronic data that represents a resource locator, such as a UPC or URL, from an input device 328, 330. From the received resource locator data, the resource interface program 326 can resolve the identity of the resource and the location of the resource in the resource system 304. The print unit 314 can then print the requested resource.

It should be appreciated that the examples of a resource acquisition system described thus far do not require a computer monitor or other type of display device to render a resource. The resources can be rendered for a consumer with only the printing device 302 having an integrated scanning device 320, or with only the printing device 302 having an integrated receiving device 322. It should also be appreciated that while the printing device 302 is illustrated having an integrated scanning device 320 and an integrated receiving device 322, features and aspects of the functionality described herein can be distributed across different computing and/or printing devices.

Furthermore, the examples described herein pertaining to a music store, pharmacy, and hardware store resource station are just a few examples of the many possibilities for product information distribution and resource acquisition. Although the examples mainly describe product information, it is to be appreciated that resources corresponding to any product, service, or combination thereof can be made available with the component and network systems described herein.

Figure 4:
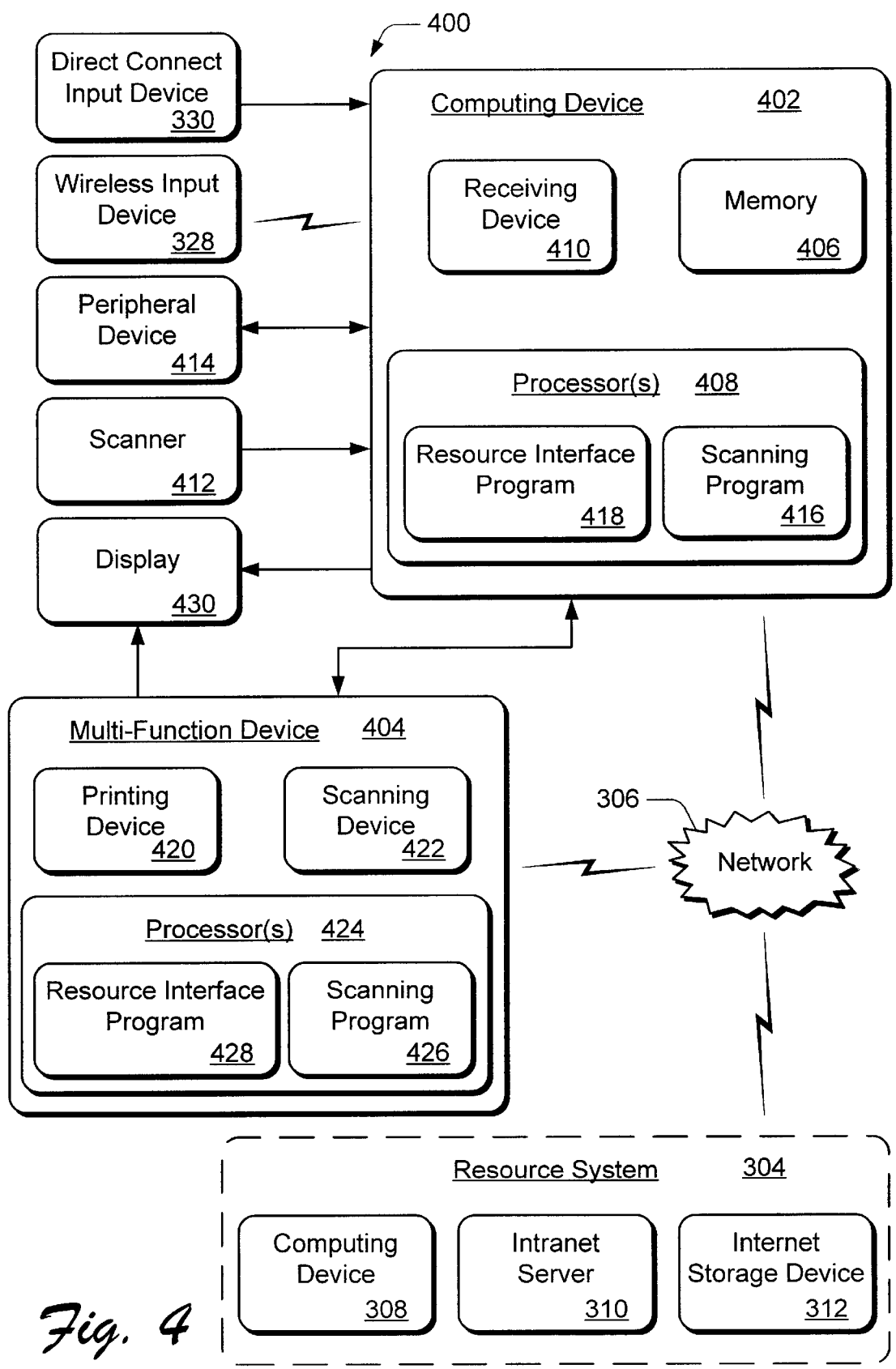
FIG. 4 is a block diagram that illustrates components of alternative configurations of a resource acquisition and information system in an exemplary network environment.

FIG. 4 illustrates components of a network environment 400 in which alternative embodiments of a resource acquisition and information distribution system are shown. A computing device 402, a multi-function device 404, and a resource system 304 are interconnected via a network system 306. The resource system 304, components of the resource system, and the network system 306 are described above with reference to FIG. 3. Although shown having only a few components, computing device 402 can include, or be implemented with, one or more of the components of the exemplary computing device 200 (FIG. 2).

Computing device 402 includes a memory 406, one or more processors 408, and a receiving device 410. The computing device 402 can receive an input at the receiving device 410 from a wireless input device 328, a direct connect input device 330, a scanner 412, or one of many possible other types of a peripheral device 414. Examples of a wireless input device 328, a direct connect input device 330, and a receiving device are described above with reference to FIG. 3. Additionally, a scanning program 416 and an resource interface program 418 executes on a processor 408. Examples of a scanning program and an resource interface program are described above with reference to FIG. 3.

The multi-function device 404 includes a printing device 420, a scanning device 422, and one or more processors 424. The printing device 420 can include one or more of the components of the exemplary printing device 100 (FIG. 1). The scanning device 422, scanning program 426, and resource interface program 428 are described above with reference to FIG. 3. The scanning program 426 can process an image scanned with the scanning device 422 and the resource interface program 428 can resolve a resource request. Alternatively, the scanning program 416 at computing device 402 can process an image scanned with the scanning device 422 and the resource interface program 418 can resolve a resource request.

The printing device 420 can render manufacturer or distributor information, or a resource requested by a consumer via a wireless input device 328, a direct connect input device 330, a peripheral device 414, scanner 412, computing device 402, or scanning device 422. Additionally, a display device 430 can render a requested resource, or manufacturer or distributor information. Typically, a browser application (not shown) can facilitate rendering information on a monitor or display device 430.

In one embodiment of network environment 400, a resource acquisition station facilitates a consumer request to update a digital versatile disk video (DVD-video). A consumer of a DVD product can scan a UPC or URL associated with the product and have the product updated while in a DVD player (e.g., a peripheral device 414). The product can be scanned with scanning device 422 and scanning program 426 can determine the resource locator from the scanned image. Resource interface program 428 can resolve the identity of the resource and the resource location in the resource system 304. Upon receipt of the resource from the resource system 304, the computing device 402 can download the resource to the peripheral device 414 to update the DVD product.

In conjunction with obtaining a resource and updating a peripheral device 414 (or a corresponding product such as the DVD, for example), an associated resource can be printed with the printing device 420 and/or rendered on the display device 430. That is, a consumer can request and receive a resource while at the same time a product manufacturer or distributor can target the consumer with related product information.

Method for Resource Acquisition

Figure 5:
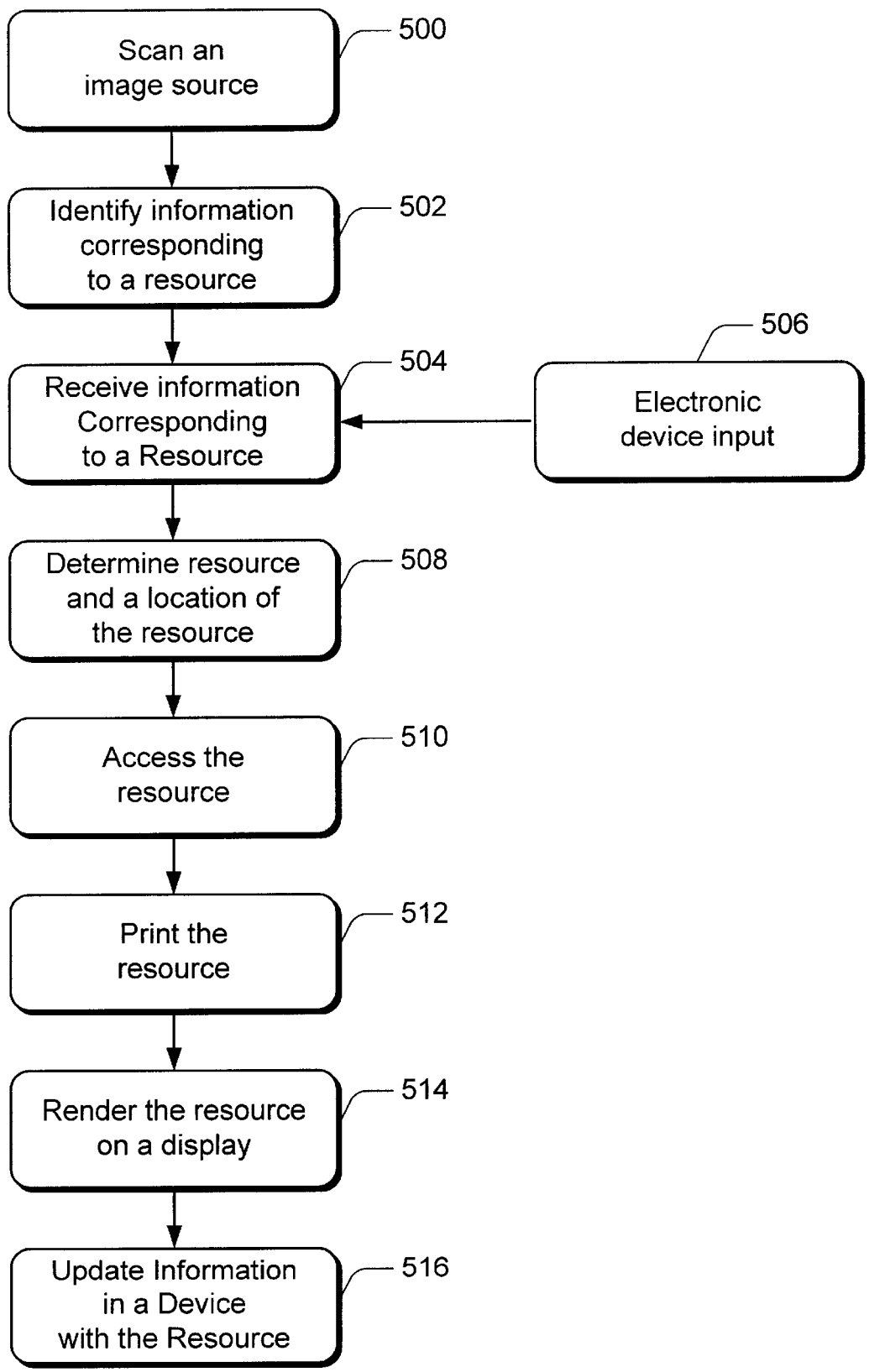
FIG. 5 is a flow diagram that describes a method to acquire and receive resources with the various resource acquisition and information systems shown in FIGS. 3 and 4.

FIG. 5 illustrates a method for acquiring a resource in a network environment and refers to components described in FIGS. 3 and 4 by reference number. The order in which the method is described is not intended to be construed as a limitation. Furthermore, the method can be implemented in any suitable hardware, software, firmware, or combination thereof.

At block 500, an image source is scanned with a scanning device 320. At block 502, information corresponding to a resource is determined, or identified, from the image source. The scanning component 324, for example, determines the information which can include a resource locator such as a UPC or a URL. At block 504, information corresponding to a resource is received, such as with resource interface program 326, for example. The information received can pertain to a resource request initiated at a scanning device 320 (block 500), or at an electronic input device, such as a wireless input device 328 or a direct connect input device 330 (block 506).

At block 508, the identity of the resource and a location of the resource is determined from the information, or resource locator. The interface program 326 is an example of a component that can determine the location of the resource in the resource system 304. At block 510, the resource is accessed and downloaded from the resource system 304. The resource is then printed with print unit 314 or printing device 420 (block 512) and/or the resource is rendered on a display device 430 (block 514), and/or the resource is downloaded to peripheral device 414 to update information in the device, or update a product associated with the device (block 516).

CONCLUSION

A resource acquisition station helps consumers access such resources as product information and enables product manufacturers and distributors to distribute product information to consumers. The resource station can be implemented with a printer and does not require a computer display device to render resources for a consumer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A printer, comprising:
   one or more processors;
   a scanning device configured to scan an image of a resource locator that corresponds to a resource of a resource system;

a resource interface program configured to execute on the one or more processors and interface the printer with the resource system, the resource interface program being further configured to determine a location of the resource from the scanned image of the resource locator; and a printer unit configured to print the resource when the resource is received from the resource system.

2. A printer as recited in claim 1, wherein the resource locator is a uniform locator (URL), and the resource interface program determines the location of the resource from the scanned image of the URL.

3. A printer as recited in claim 1, wherein the resource locator is a universal product code (UPC), and the resource interface program determines the location of the resource from the scanned image of the UPC.

4. A printer as recited in claim 1, further comprising a receiving device configured to receive the resource locator as a wireless input.

5. A resource acquisition system, comprising:

a printing device communicatively linked to a resource system and configured to print a resource of the resource system;

a scanning device configured to scan an image of a resource locator and input the scanned image to the printing device, the resource locator corresponding to the resource; and a resource interface program in the printing device configured to determine a location of the resource from the scanned image of the resource locator, the resource interface program further configured to access the resource.

6. A resource acquisition system as recited in claim 5, wherein the scanning device is further configured to input the scanned image of the resource locator to the printing device via a wireless connection.

7. A resource acquisition system as recited in claim 5, wherein the resource locator is a uniform resource locator (URL), and wherein the scanning device is further configured to input the scanned image of the URL to the printing device.

8. A resource acquisition system as recited in claim 5, wherein the resource locator is a universal product code (UPC), and wherein the scanning device is further configured to input the scanned image of the UPC to the printing device.

9. A printing device, comprising:

a receiving device configured to receive a scanned image of a resource locator that corresponds to a network-accessible resource;

the printing device configured to access the network-accessible resource, and print the network-accessible resource.

10. A printing device as recited in claim 9, wherein the printing device receives the scanned image of the resource locator from an input device via a wireless connection.

11. A printing device as recited in claim 9, wherein the printing device receives the scanned image of the resource locator from a scanning device.

12. A method performed by a printing device, the method comprising:

receiving a scanned image of a resource locator corresponding to a network-accessible resource;

determining a location of the network-accessible resource from the scanned image of the resource locator;

accessing the network-accessible resource; and printing the network-accessible resource when the network-accessible resource is received.

13. A method as recited in claim 12, wherein the resource locator is a uniform resource locator (URL), and wherein said determining includes determining the location of the network-accessible resource from the scanned image of the URL.

14. A method as recited in claim 12, wherein the resource locator is a universal product code (UPC), and wherein said determining includes determining the location of the network-accessible resource from the scanned image of the UPC.

15. A method as recited in claim 12, wherein said receiving the scanned image of the resource locator is via a wireless connection.

16. A method as recited in claim 12, wherein said receiving the scanned image of the resource locator is from a portable phone via a wireless connection.

17. A method as recited in claim 12, wherein said receiving the scanned image of the resource locator is from a personal digital assistant via a wireless connection.

18. A method as recited in claim 12, wherein said receiving the scanned image of the resouce locator is from a scanning device.

19. One or more computer-readable media comprising computer-executable instructions that, when executed, direct a printer to:

receive a scanned image of a resource locator that corresponds to a network-accessible resource;

determine a location of the network-accessible resource from the scanned image of the resource locator;

access the network-accessible resource at the determined location; and print the network-accessible resource when the network-accessible resource is received.

20. A method preformed by a printing device, the method comprising:

scanning a resouce locator corresponding to a network-accessible resource;

determining a location of the network-accessible resource from a scanned image of the resource locator;

accessing the network-accessible resource at the determined location; and printing the network-accessible resource when the network-accessible resource is received.

21. A method as recited in claim 20, wherein the resource locator is a uniform resource locator (URL), and wherein said determining includes determining a location of the network-accessible resource from the scanned image of the URL.

22. A method as recited in claim 20, wherein the resource locator is of a universal product code (UPC), and wherein said determining includes determining a location of the network-accessible resource from the scanned image of the UPC.

23. One or more computer-readable media comprising computer-executable instructions that, when executed, direct a printer to:

scan a resource locator corresponding to a network-accessible resource;

determine a location of the network-accessible resource from the scanned image of the resource locator;

access the network-accessible resource at the determined location; and print the network-accessible resource when the network-accessible resource is received.

24. A method, comprising:

scanning information to form a scanned image;

identifying a resource locator in the scanned image, the resource locator associated with a network-accessible resource;

accessing the resource; and updating a peripheral device with the resource.

25. A method as recited in claim 24, wherein the resource locator is a uniform resource locator (URL), and wherein the method further comprises determining from the URL a location of the resource.

26. A method as recited in claim 24, wherein the resource locator is a universal product code (UPC), and wherein the method further comprises determining from the UPC a location of the resource.

27. One or more computer-readable media comprising computer-executable instructions that, when executed, direct a printer to perform a method, comprising:

scanning information to form a scanned image;

identifying a resource locator in the scanned image, the resource locator associated with a network-accessible resource;

accessing the resource; and updating a peripheral device with the resource.

* * * * *